United States Patent [19]

Pinkham

[11] 4,282,888
[45] Aug. 11, 1981

[54] APPARATUS FOR STRIPPING LEAVES FROM A STALK CURED TOBACCO PLANT

[75] Inventor: Jesse R. Pinkham, Winston-Salem, N.C.

[73] Assignee: R. J. Reynolds Tobacco Company, Winston-Salem, N.C.

[21] Appl. No.: 972,548

[22] Filed: Dec. 22, 1978

[51] Int. Cl.³ .............................................. A01D 1/00
[52] U.S. Cl. .................................. 130/30 R; 56/27.5
[58] Field of Search .............. 131/120, 128, 131, 149; 56/27.5; 130/30 R

[56] References Cited

U.S. PATENT DOCUMENTS

| | | | |
|---|---|---|---|
| 1,311,183 | 7/1919 | Seaver | 131/128 |
| 1,518,349 | 12/1924 | Olson | 131/128 |
| 2,574,030 | 11/1951 | Green | 131/131 |
| 2,696,069 | 12/1954 | Hawkins | 131/131 |
| 2,989,056 | 6/1961 | La Motte | 131/131 |
| 3,077,985 | 2/1963 | Anderson | 131/131 |
| 3,093,949 | 6/1963 | Splinter | 131/131 |
| 3,380,460 | 4/1968 | Fuis et al. | 131/131 |
| 3,453,815 | 7/1969 | Harrington et al. | 56/27.5 |
| 3,765,424 | 10/1973 | Morrison et al. | 131/131 |

FOREIGN PATENT DOCUMENTS

| | | | |
|---|---|---|---|
| 2310711 | 12/1976 | France | 130/30 R |
| 85922 | 12/1974 | U.S.S.R. | 130/30 R |

Primary Examiner—V. Millin
Attorney, Agent, or Firm—Grover M. Myers; Manford R. Haxton

[57] ABSTRACT

An apparatus for stripping the leaves from a cured tobacco plant including a conveyor which receives the tobacco plants with the leaves disposed on opposite sides of the conveyor. A clamping mechanism located adjacent the conveyor means which engages and holds the leaves as the stalk is continuously moved past the clamping means to pull the leaves from the stalk.

10 Claims, 9 Drawing Figures

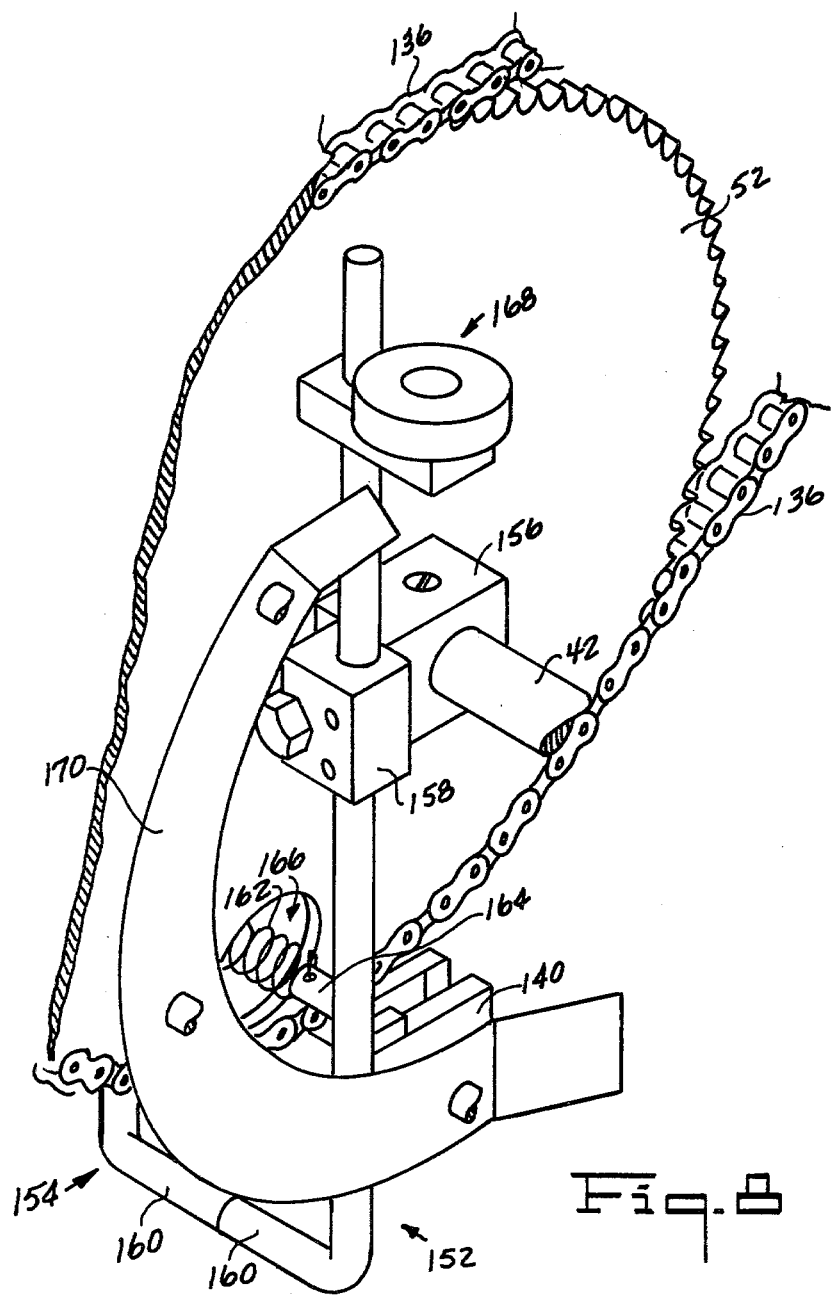

APPARATUS FOR STRIPPING LEAVES FROM A STALK CURED TOBACCO PLANT

BACKGROUND OF THE INVENTION

This invention relates to an apparatus for stripping leaves from a stalk of cured tobacco and separating the leaves into stalk position or grade.

Certain varieties of tobacco such as burley, fire-cured, Maryland, sun-cured and the like are cured wth the leaves remaining on the stalk. When harvesting this type of tobacco, the entire stalk is cut near the bottom and the butt end of the stalk is pierced by a handling stick or string and hung upside down in a curing barn or shed. After the tobacco is cured, sometimes by the addition of heat, moisture is added back to the leaves to prevent them from shattering during handling. The leaves are then removed from the stalk.

Normally, the leaves of the stalk-cured tobacco are stripped from the stalk by hand. The workman would remove all of the leaves of one grade (stalk position) and stack each grade in separate piles. Although there have been numerous attempts to develop methods and apparatus which will reduce the time and labor for this task, the majority of stalk cured tobacco is still stripped by hand.

U.S. Pat. No. 3,077,985 to Anderson illustrates one apparatus which has been developed. This device still requires the leaves to be removed by hand but provides a frame with rotatable containers or bins so that the workman at each work station can deposit leaves of the same grade in a particular bin.

Another type of tobacco stripper and classifier is illustrated in U.S. Pat. No. 2,939,036 to Matte. In this stripper the tobacco leaf stalk is secured to rotating heads and a knife is moved along the stalk as it rotates to sever the leaves from the stalk. The leaves fall on a conveyor directly below the rotating stalks generally in their stalk position and, thus, are graded. In this device, the stalk must be stiff, otherwise, when it rotates, the knife will not trim the leaves.

Other types of apparatus have been used which simply strip the leaves from the stalk as the stalks are drawn through an orifice or adjustable opening of some type. These types of stripper normally do not have a method of classifying or grading the leaves other than by hand.

SUMMARY OF THE INVENTION

It is, therefore, an object of this invention to provide a stalk stripper and classifier which will automate the stripping and classifying process and overcome the problems of the prior art.

Another object of this invention is to provide an apparatus which will strip the leaves from the stalk with a pulling motion similar to the removal by hand.

Another object of this invention is to provide an apparatus which will separate and align the tobacco leaves prior to their being pulled from the stalk.

Still another object of this invention is to provide a tobacco stalk stripper which has a generally continuous operation and reduces the labor required.

These and other objects are accomplished by the present invention through the use of a tobacco stalk stripper which has a conveyor for transporting the tobacco plants through a stripping station. A clamping mechanism at the stripping station is synchronized with the conveyor so that the tobacco leaves are contacted by the clamp and held as the stalk of the plant is pushed continuously through the stripping station. As the tobacco leaves are pulled from the stalk, they are deposited on a belt conveyor in their stalk positions. A feeding mechanism is provided to insure that the leaves are positioned and aligned properly on opposite sides of the transporting conveyor.

BRIEF DESCRIPTION OF THE DRAWINGS

The foregoing and additional objects, features and advantages of the present invention will be apparent to those skilled in the art from the following detailed description of a preferred embodiment thereof, taken with the accompanying drawings, in which:

FIGS. 8 and 9 are perspective details of the large feed sprocket and stalk guide mechanisms utilized with the present invention.

DESCRIPTION OF A PREFERRED EMBODIMENT

Figure 1:
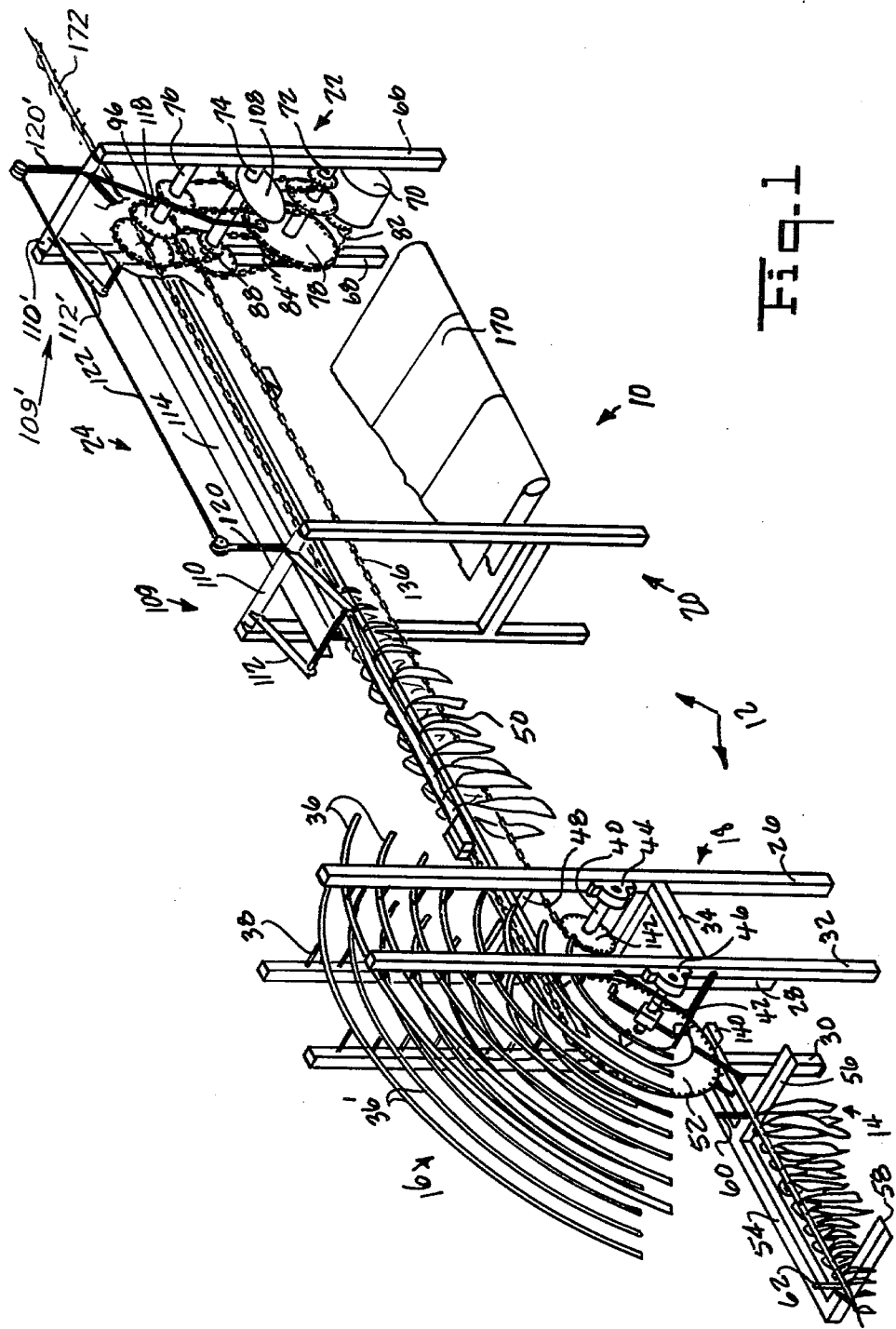
FIG. 1 is a perspective of the tobacco stalk stripper and classifier according to the present invention.
Figure 2:
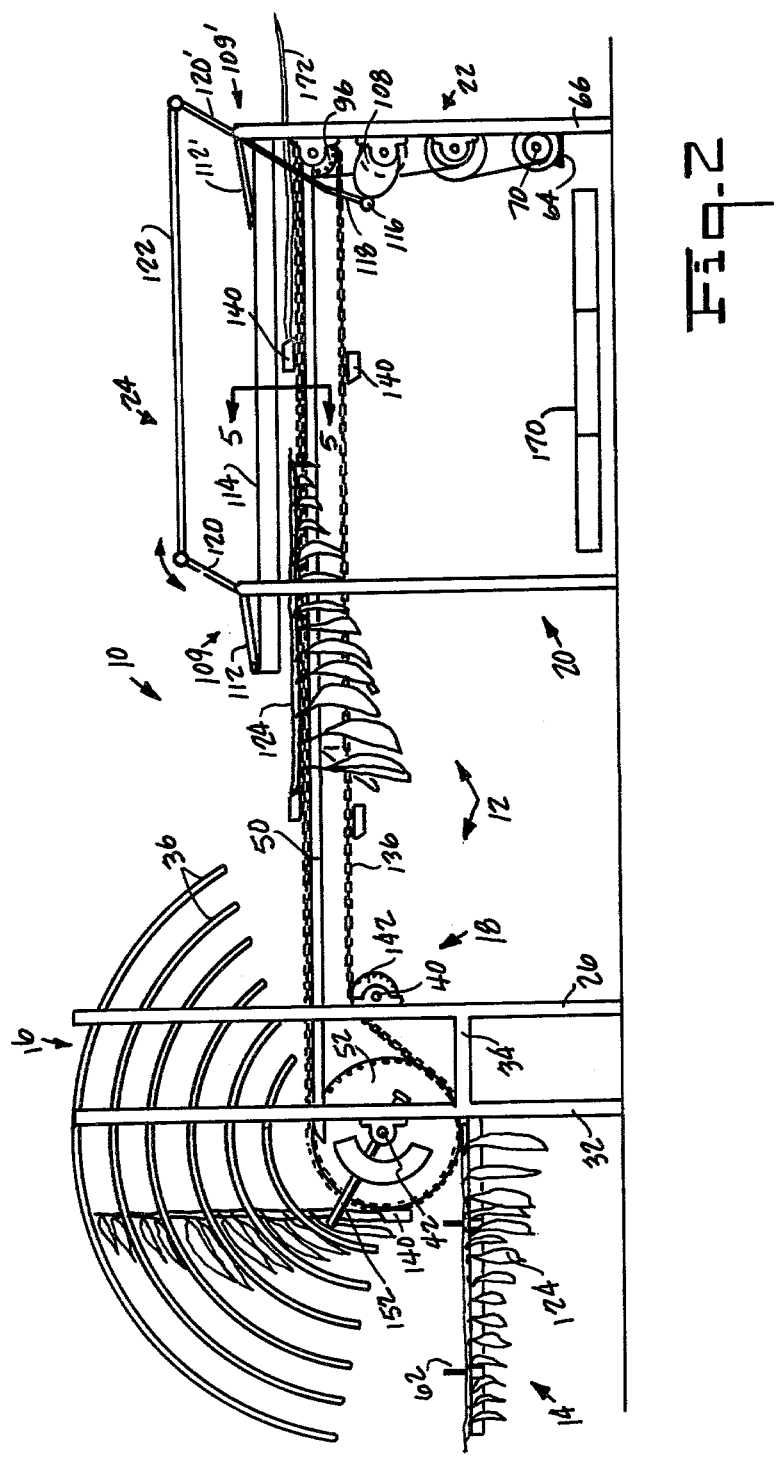
FIG. 2 is a side elevation view of the tobacco stalk stripper and classifier according to the present invention.

Referring more particularly to the drawings, in FIGS. 1 and 2 the numeral 10 indicates a tobacco leaf stalk stripper or stalk stripper and classifier unit. The stalk stripper has a frame 12 including a feed rack or section 14, a leaf aligning section 16, a forward conveyor support 18 and a forward and rear conveyor and clamp support 20 and 22 for a clamping mechanism 24. The frame is constructed of standard angle bar and rod structural members.

The forward conveyor support 18 has four vertical, parallel legs or posts 26, 28, 30 and 32. Posts 26 and 32 and posts 28 and 30 are secured together near their mid-points by cross bars 34 and 34' (not shown), respectively, and by the curved aligning members 36 and 36' near their upper ends. The curved aligned members 36 are suitably attached by welding or other means to studs 38 which are, in turn, welded to an appropriate post. Posts 26 and 28 and posts 30 and 32 are spaced apart and secured together by rotatable shafts 40 and 42 which are journaled in suitable bushings 44 and 46, respectively, secured to the posts. A transverse bar 48 is secured between posts 26 and 28 above shaft 40 and supports one end of the stalk transporting support channel 50. The forward end of the support channel has a slot (not shown) through which a large forward feed sprocket 52 for the transporting conveyor passes. The forward sprocket or gear is carried on rotatable shaft 42. Other structural braces are provided but are not shown for clarity.

Extending forward of posts 30 and 32 is the stalk feeding rack 14 including a longitudinal member 54 which is attached to post 30. The longitudinal member has a pair of spaced transverse members 56 and 58 secured thereto, which carry vertical studs 60 and 62, respectively. The studs are positioned so that they will properly align a stalk with the transporting conveyor.

Figure 3:
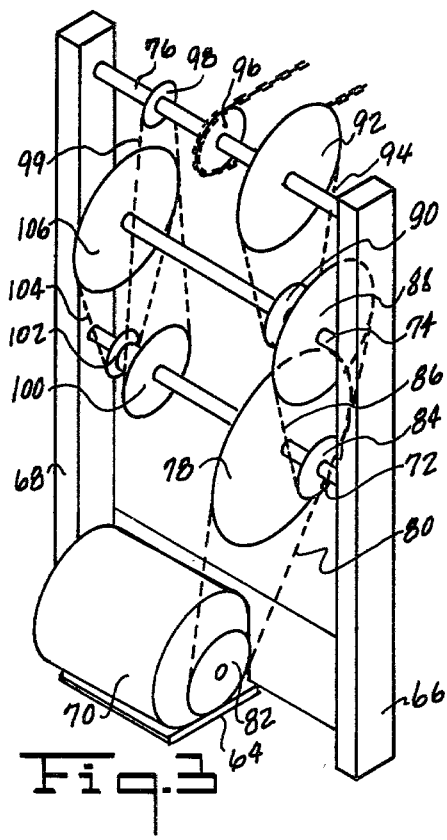
FIG. 3 is a perspective schematic of the drive mechanism utilized with the stalk stripper according to the present invention.

The conveyor support channel 50 extends rearwardly and is attached to the rear supports 20 and 22 by transverse members which are not shown. The rear support 22 carries the drive mechanism for the stripper which can be seen in more detail in FIG. 3.

A mounting bracket 64 secured between legs 66 and 68 of the rear support carries a motor 70. The motor will generally be a single speed motor and is utilized to drive the conveying mechanism as well as the clamping mechanism for the stalk stripper. Positioned above the motor and extended between legs 66 and 68 are three parallel rotatable shafts 72, 74 and 76.

The lower shaft 72 carries a large pulley 78 which is keyed to the shaft and is driven by a pulley belt 80 circumscribing the large pulley 78 and a motor pulley 82. Adjacent the pulley 78 and keyed to shaft 72 is a small gear 84 which is circumscribed by link chain 86 which extends upwardly and circumscribes gear 88 keyed to the immediate or cam shaft 74. Adjacent to gear 88 and keyed to the cam shaft 74 is another gear 90 which drives the upper or conveyor shaft 76 through key gear 92 carried on the shaft and endless link chain 94. At approximately the mid-point of the conveyor shaft 76 is a rear conveyor sprocket 96 which extends into a slot (not shown) in the conveyor channel 50 similarly to forward sprocket 52. Conveyor shaft 76 also carries cam drive gear 98 which is keyed to the shaft and is encircled by chain 99 which extends downwardly to a floating or idler gear 100 carried on shaft 72. Secured to floating gear 100 and also floating on shaft 72 is another gear 102 which has an endless link chain 104 which extends upwardly to encircle another idler or floating cam gear 106 carried on cam shaft 74. The cam gear 106 has a cam 108 secured thereto which rotates with the cam gear. The ratio of the gearing arrangement illustrated is preferably 6 to 1 between the conveyor and the cam. For example, six (6) revolutions of the conveyor shaft equals to one (1) revolution of the cam shaft.

Located at the top of each of the rear supports 20 and 22 are clamping mechanism linkages 109 and 109'. The clamping linkages have a rotatable shaft 110 and 110' journaled at the top and transversely between the legs of supports 20 and 22. Fixedly secured to the rotatable shafts are rigid lever arm assemblies 112 and 112' which have a pair of parallel longitudinal members and a transverse cross member extending between the end of the longitudinal members. The transverse members are fixedly secured to the top of the upper channel clamp 114. The legs of the channel clamp 114 extend downwardly and they cooperate with the lower conveyor channel 50 to form the clamping mechanism which holds the tobacco leaves as they are stripped from the stalk. (see FIG. 5) The channel clamp 114 is manipulated by the cam 108.

Figure 5:
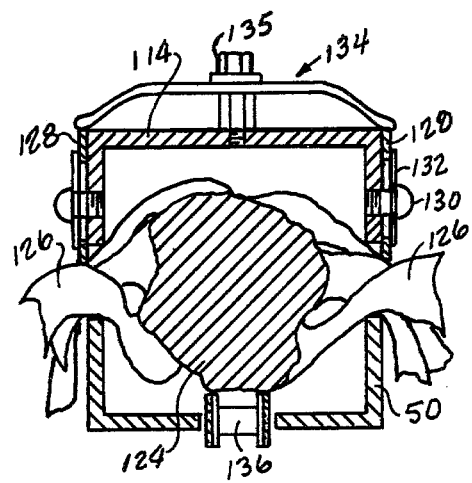
FIG. 5 is a cross section taken along line 5—5 of FIG. 2.

A cam follower 116 (see FIG. 2) contacts the cam 108 and has a lever arm 118 attached thereto which extends upwardly and is rigidly secured to the rear rotated shaft 110'. Also rigidly secured to the forward and rear rotatable shafts 110 and 110' are upwardly extending levers 120 and 120', respectively, which have a longitudinal bar 122 rigidly secured to their upper ends. Movement of the rear linkage 109' is transferred to the forward linkage 109 through the longitudinal bar 122. The cam mechanism is used to open the clamping channel 114 as a stalk 124 is transported into the clamping station. The weight of the clamping channel is used to hold the leaves 126 as can be seen in FIG. 5. Although in this simplified version illustrated herein the channel is shown alone, it might be necessary to utilize weights on the channel or other suitable means to insure that the channel will clamp the leaves securely. In the preferred embodiment, the clamping channel 114 is maintained in the clamping position for approximately three (3) seconds.

Figure 4:
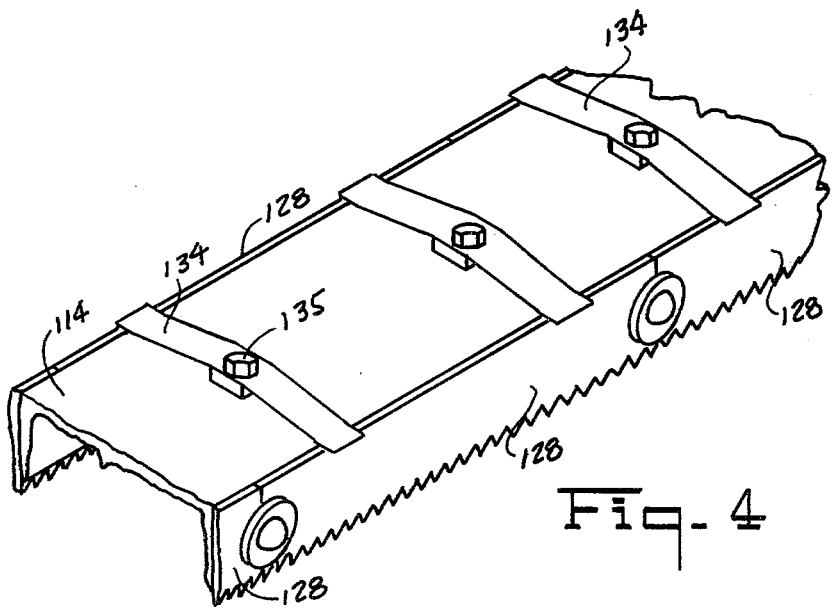
FIG. 4 is a perspective detail illustrating the upper clamping bar utilized in the present invention.

Since each tobacco plant will have leaf stems of varying sizes, it is necessary to provide an adjustable member to the clamping channel 114 to insure that all the leaves will be securely held during the stripping operation. Therefore, the clamping channel 114 has a series of moveable sawtooth sections 128 attached to its legs (see FIGS. 4 and 5). The sections are secured to the legs by a washer 132 and a bolt 130 which extends through slots in the end of the sections, thereby permitting the section to slide. Tension leaf springs 134 secured by bolts 135 are provided on the top of the channel to hold the sections down.

Turning now to the transporting conveyor mechanism. The conveyor is preferably an endless link chain 136 and carries a plurality of cups 140 which are used to engage and push the tobacco plant 124 through the stripping station. The chain 136 has an upper reach which extends from forward sprocket 52 through the conveying channel 50 and circles the rear conveyor gear 96 carried on the shaft 76. The lower reach of the conveyor chain passes below the conveyor channel.

Although in the preferred embodiment illustrated herein a feed mechanism is provided to feed the plants 124 into the conveyor, it should be understood that the stripper can be utilized without the feed mechanism. This is accomplished by simply utilizing a conveyor sprocket on the forward supports and placing each stalk on the conveyor manually.

Figure 7:
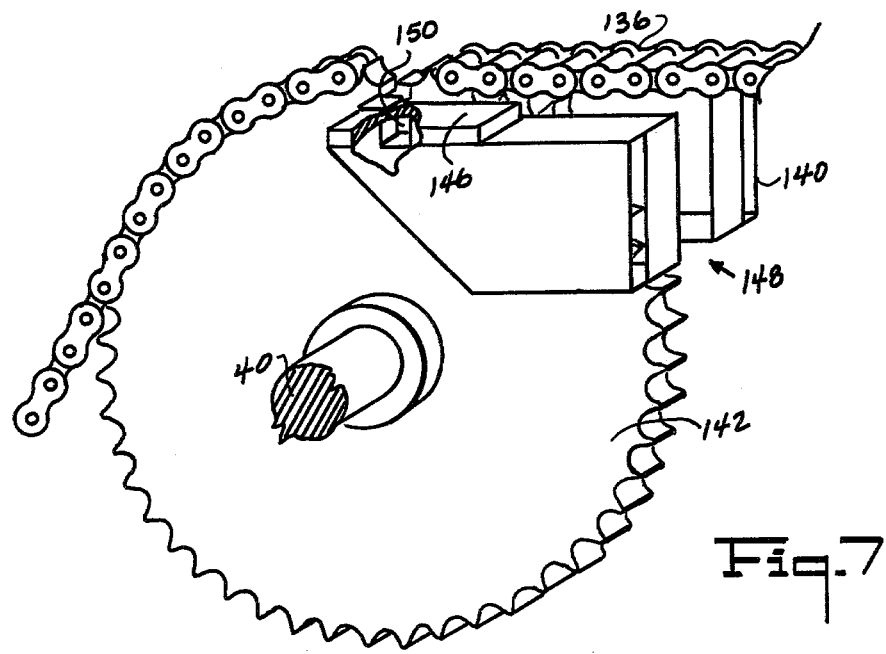
FIG. 7 is a perspective detail of the idler sprocket mechanism illustrating the stalk cup passing over the idler sprocket.
Figure 6:
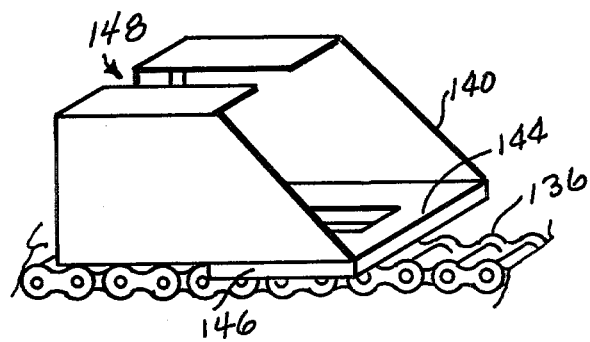
FIG. 6 is a perspective detail of a cup or pusher member utilized on the transporting conveyor of the present invention.

However, in order to give the operator time to accomplish other tasks, the plant feed mechanism illustrated herein can be utilized. The tobacco plants 124 are placed on the transverse members 56 and 58 and are aligned by contacting studs 60 and 62. To insure that the rear end of the plant is inserted into one of a plurality of cups 140 carried in the conveyor chain 136, the chain 136 passes over idler gear 142 carried on shaft 40 (see FIGS. 6 and 7). Each of the cups 140 are slotted; however, their forward end is closed at 144 which is attached to a plate 146 that is secured to chain 136. The slot 148 permits the gear 142 to pass through the cup. The gear has a notch 150 which receives the closed end 144 of the cup as the cup passes over the gear. The chain is then directed downwardly where the cup will engage the rear end of the tobacco plant. The forward conveyor gear or sprocket 52 has a circumference equal to the distance between the cups on the conveyor and in this preferred embodiment is approximately six (6) feet.

Figure 9:
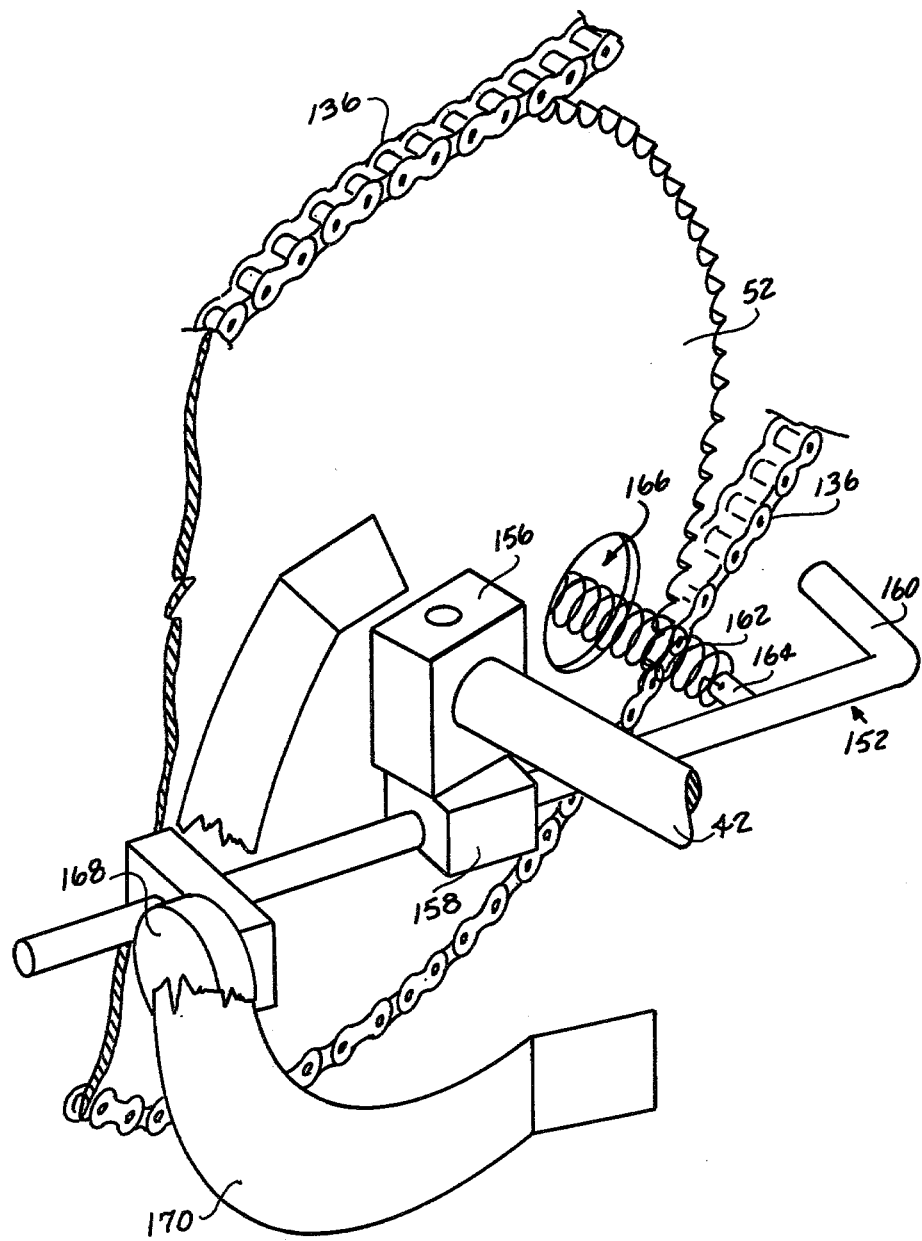

Although the stalks are relatively rigid, in order to insure that the plant is pulled around the sprocket and placed on the upper reach of the conveyor, a pair of cooperating pivotal guides 152 and 154 are provided. In FIGS. 8 and 9, a detailed illustration of the guides is shown and, although only one side can be seen, it should be understood, that guide 156 functions in the same way as guide 154 as will be described.

Adjacent to the sprocket 52 is a block 156 fixedly secured to shaft 42 by a set screw or other suitable means. Suitably attached to the fixed block 156 is a pivotal block 158. Extending through the pivotal block is L-shaped guides 160 and 160' which extend beyond the periphery of the sprocket 52 and below the cup 140 (see FIG. 8). The ends of the short legs of the L-shaped guides contact one another and are held close by a tension spring 162 attached to studs 164 secured to the long leg of the guides. The spring extends through an aperture 166 in sprocket 152. On the opposite end of the guide 160 is a cam follower 168 which will engage a cam surface 170 to force the pivotal guides open (see FIG. 9). The cam surfaces are suitably secured to the frame and are positioned so that the guides pivot open just prior to their passing the upper reach of the conveyor and close after they have passed the lower reach of the conveying chain.

OPERATION

Turning now to the operation of the stripping mechanism, a plant 124 is placed on transverse feed bars 56 and 58 and contacts the studs 60 and 62. A cup 140 on the conveyor chain 136 passes over the idler sprocket 142 and moves downwardly to engage the rear end of the plant. The pivotal guides are closed and contact the stalk to aid the cup in lifting the stalk off of the feed bars. The stalk is carried around upwardly through the curved aligned bars which separate the leaves and aid in positioning the leaves on opposite sides of the conveyor channel 50. The cup pushes the plant rearwardly along the channel into the stripping station with the upper clamping channel 114 in the up position. As the plant reaches the clamping station, cam 108 reaches its low point and the weight of the clamping channel causes it to be lower and the leaves of the plant are held between the clamping channel 114 and the conveying channel 50. The cup 140 continues to push the plant so that the leaves are pulled from the stalk. The leaves are then released as the clamping channel 114 is raised by the cam 108. The leaves fall on a conveyor belt 170 which is positioned below the stripper. The stalk 172 continues through the stripper and falls off the end of the conveyor. Since the leaves are pulled from the stalk in generally their stalk positions, when they fall on the conveyor, they normally remain in these positions and are, therefore, properly graded into the usual three stalk position grades.

From the above description and drawings, it can be seen that the stalk stripper illustrated can be operated in a continuous manner and is fully automated. It also permits the leaves to be pulled from the stalk and allows them to be deposited in the respective stalk positions.

Various changes in the structure of the described embodiment can be made as well as in the drive mechanism; however, these and other changes can be made without departing from the basic concept of the invention which are defined in the following claims.

I claim:

1. An apparatus for stripping the leaves from a stalk of a tobacco plant comprising:
   (a) conveyor means for receiving a tobacco plant with its leaves disposed on at least one side of the conveyor means; and
   (b) clamping means located adjacent the conveyor means which engage hold and maintain the leaves in their relative stalk position as the stalk is moved continuously past the clamping means to pull the leaves from the stalk.

2. The apparatus of claim 1, further including a plant feeding means for placing the plants on the conveyor means so that the leaves are disposed on opposite sides thereof.

3. The apparatus of claim 1, further including means located adjacent the clamping means to receive the leaves released from the clamping means, whereby the leaves are maintained in their relative stalk position.

4. The apparatus of claim 1, wherein said conveyor means includes:
   (a) a frame having a first and second support;
   (b) a longitudinal member extending between said first and second support;
   (c) first and second rotatable shafts carried on said first and second supports, respectively;
   (d) first and second sprockets carried on said first and second rotatable shafts, respectively;
   (e) endless chain encircling said first and second sprockets;
   (f) at least one pusher means carried on said endless chain; and
   (g) drive means for driving one of said rotatable shafts.

5. The apparatus of claim 4, wherein said clamping means includes:
   (a) first channel with its sides extended upwardly through which said endless chain passed, said first channel located adjacent to said second sprocket means;
   (b) a second channel with its sides extended downwardly and located above said first channel, said downwardly extending sides aligned with said upwardly extending sides of said first channel; and
   (c) means for manipulating said second channel towards said first channel as the tobacco plant passes on said conveyor means.

6. The apparatus of claim 5, wherein said means for manipulating said second channel means includes:
   (a) lever arm assembly attached to said second channel and carried on said second support;
   (b) cam means carried on said second support, said cam means being synchronized with said conveyor means, and driven by said drive means; and
   (c) cam follower means engaging said cam means and secured to said lever arm assembly to raise said second channel as said tobacco plant is moved between said first and second channels.

7. The apparatus of claim 5, further including moveable sections carried on the sides of said second channel to permit the clamping means to adjust to varying leaf stem sizes.

8. The apparatus of claim 4, further including a plant feeding means for placing plants on the conveyor means so that the leaves are disposed on opposite sides thereof.

9. The apparatus of claim 8, wherein said feeding means includes:
   (a) a rack for receiving a plurality of plants and aligning one plant with said endless chain, said rack being located adjacent and below said first support, said pusher means on said endless chain having a generally cup-shaped configuration for receiving the rear end of said tobacco plant; and
   (b) guide means located on opposite sides of said first conveyor sprocket which engage the tobacco plant upon insertion into the cup-shaped pusher, said guide means aiding the cup-shaped pusher in lifting the plant from said rack and placing it on the upper reach of said conveying chain.

10. The apparatus of claim 9, further including curved aligning members located adjacent and on opposite sides of said endless chain, said curved aligning members being contiguous to said first sprocket so that the leaves of the plant will be combed by the curved aligning members as the plants are lifted from the rack onto the upper reach of said conveying means.

* * * * *